(12) United States Patent  (10) Patent No.: US 7,631,463 B2
Greenlee et al.  (45) Date of Patent: Dec. 15, 2009

(54) STAIR HANGER

(75) Inventors: Greg Greenlee, Savage, MN (US); Todd Grevious, Faribault, MN (US); Nathan John Peterson, Minneapolis, MN (US)

(73) Assignee: United Steel Products Company, Montgomery, MN (US)

( * ) Notice: Subject to any disclaimer, the term of this patent is extended or adjusted under 35 U.S.C. 154(b) by 51 days.

(21) Appl. No.: 11/507,143

(22) Filed: Aug. 21, 2006

(65) Prior Publication Data

US 2008/0040992 A1 Feb. 21, 2008

(51) Int. Cl.
 *E04B 1/38* (2006.01)
 *E04F 11/025* (2006.01)
(52) U.S. Cl. .................... 52/182; 52/191; 52/92.2; 52/715; 52/702; 403/232.1
(58) Field of Classification Search ............... 52/702, 52/712, 289, 696, 715, 182, 191, 92.2, 93.1, 52/714; 403/DIG. 15, 232.1; 248/220.1, 248/220.21, 224.8
 See application file for complete search history.

(56) References Cited

U.S. PATENT DOCUMENTS

| | | | | |
|---|---|---|---|---|
| 939,005 | A * | 11/1909 | Goedeke | 217/69 |
| 960,412 | A * | 6/1910 | Sandblom | 52/182 |
| 2,704,868 | A * | 3/1955 | Danielson | 52/210 |
| 4,039,137 | A * | 8/1977 | Smith | 248/248 |
| 4,106,591 | A * | 8/1978 | Cohen et al. | 182/93 |
| 4,414,785 | A * | 11/1983 | Howell | 52/169.1 |
| 4,423,977 | A * | 1/1984 | Gilb | 403/232.1 |
| 4,560,301 | A * | 12/1985 | Gilb | 403/232.1 |
| 4,572,695 | A * | 2/1986 | Gilb | 403/232.1 |
| 4,594,017 | A * | 6/1986 | Hills | 403/6 |
| 4,709,520 | A * | 12/1987 | Vochatzer | 52/191 |
| 5,217,317 | A * | 6/1993 | Young | 403/232.1 |
| 5,457,928 | A * | 10/1995 | Sahnazarian | 52/702 |
| 5,797,694 | A * | 8/1998 | Breivik | 403/231 |
| 6,125,598 | A * | 10/2000 | Lanphier | 52/182 |
| 6,474,037 | B2 * | 11/2002 | Thompson | 52/713 |
| 6,488,437 | B1 * | 12/2002 | Jensen | 403/283 |
| 6,772,570 | B2 * | 8/2004 | Horne | 52/655.1 |
| 2002/0112439 | A1 * | 8/2002 | Rosas | 52/712 |
| 2003/0154685 | A1 * | 8/2003 | Williams | 52/702 |
| 2004/0107667 | A1 * | 6/2004 | White et al. | 52/657 |
| 2004/0226252 | A1 * | 11/2004 | Sheldon | 52/716.1 |

OTHER PUBLICATIONS

Kant-Sag Construction Hardware Catalog for Parallam PSL, Beams, Headers & Columns from MacMillan Bloedel, United Steel Products Company; Montgomery, MN; 1990;17 pgs.
Simpson Strong -Tie Connectors Catalog C87H-1, Connectors for Wood Construction, Simpson Strong-Tie Company, Inc., San Leandro, CA; 1987; 9 pgs.

* cited by examiner

*Primary Examiner*—Robert J Canfield
*Assistant Examiner*—Jessie Fonseca
(74) *Attorney, Agent, or Firm*—David E. Bruhn; Dorsey & Whitney LLP

(57) ABSTRACT

A concealed connection mechanism for connecting a pair of stair stringers to the front face of a rim joist.

8 Claims, 3 Drawing Sheets

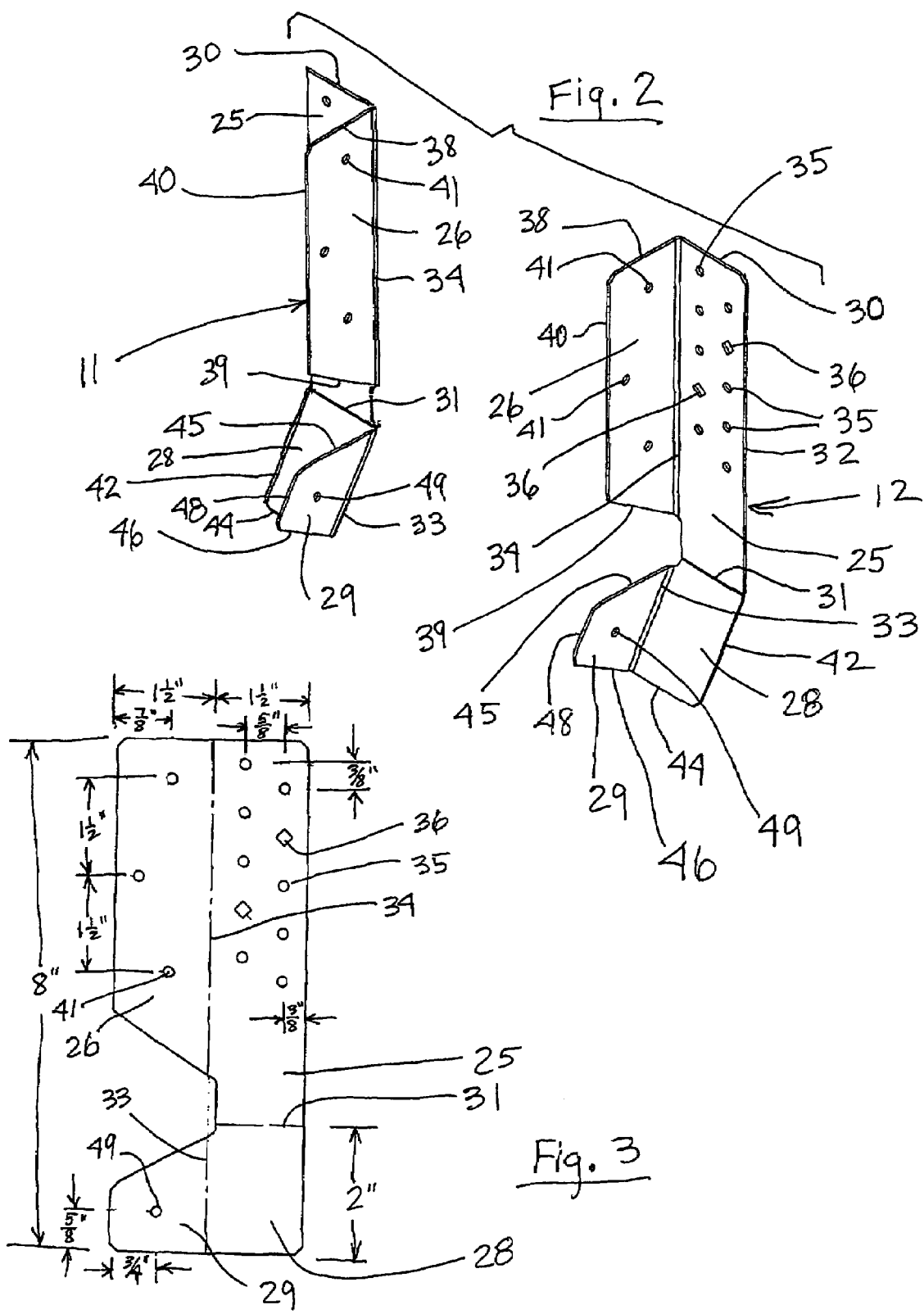

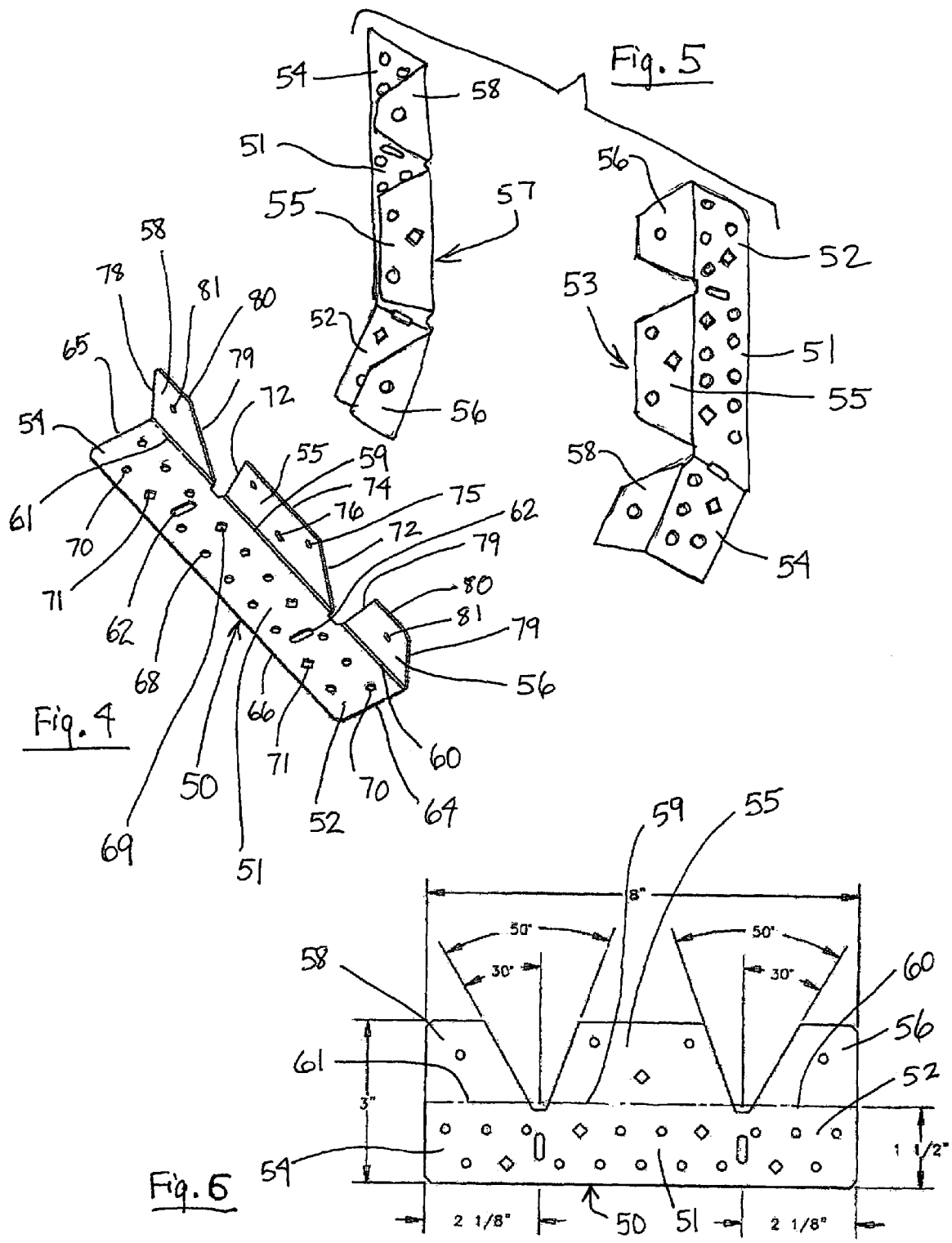

STAIR HANGER

BACKGROUND OF THE INVENTION

1. Field of the Invention

The present invention relates generally to a connection mechanism for connecting a stair stringer to a rim joist or other supporting structure. More particularly, the invention relates to a stair stringer or a pair of stair hangers for connecting two or more stair stringers to a rim joist to provide a concealed connection mechanism.

2. Description of the Prior Art

Many builders and home owners alike often struggle to find an easy structural method to connect stair stringers to the rim joist. This is a particularly common connection in virtually all deck construction. One objective of this connection is to connect the stair stringers to the rim joist with a structurally rated product which has been tested and assigned a structural load rating. A second objective, particularly in deck construction where the connection between the stair stringers and the rim joist is visually observable, is to provide a concealed connection in which the connection is not visible after installation.

The industry has come up with a variety of solutions for this need. Most commonly, framers and other deck builders will drive nails or screws through the back side of the rim joist and connect the stringer using an end grain connection. One problem with this is that the connection is not structurally rated and tested. Secondly, in some cases, the positions of the deck joists will interfere with the connection of the stair stringers or the rearward side of the rim joist may be inaccessible. In many cases, the methods employed require the use of additional building material and are time consuming. While standard joist hangers with a sloped seat are generally available and might be used in this application, they have not been tested for such application, particularly where the bottom of the stringer is typically below the bottom of the rim joist, and it does not have concealed flanges. Thus, a major objective of the present invention is not met.

Accordingly, there is a need in the art for a stair hanger and more specifically, a connection system for connecting stair stringers to the rim joist with a concealed connection.

SUMMARY OF THE INVENTION

The present invention is directed to a connection system for connecting stair or step stringers to a rim joist. More specifically, the invention is directed to a stair hanger, or a pair of stair hangers, for connecting stair stringers to the rim joist in connection with wood deck construction or the like. In one embodiment, the invention includes a pair of substantially mirror image hangers which can be used to connect a pair of stair stringers to the rim joist with a concealed connection and from the front side of the rim joist. In a second embodiment, a single, reversible hanger is provided for meeting the same objectives. Such hangers have particular applicability where a concealed connection is desired, where connection with a structural rating is desired or where access to the inside surface of the rim joist is limited.

Accordingly, an object of the present invention is to provide a connection mechanism for connecting stair stringers to the rim joist.

Another object of the present invention is to provide a connection mechanism for connecting stair stringers to the rim joist with a concealed connection and from the front side of the rim joist.

These and other objects of the present invention will become apparent with reference to the drawings, the description of the preferred embodiment and the appended claims.

DESCRIPTION OF THE DRAWINGS

FIG. 2 is an isometric view of a pair of left and right stair hangers of one embodiment of the invention.

FIG. 3 is an elevational plan view of a stair stringer blank of the embodiment of FIG. 2 prior to being bent into a stair stringer.

FIG. 4 is an isometric view of a reversible stair hanger of a second embodiment of the invention.

FIG. 5 is an isometric view of a pair of the reversible stair stringers of the embodiment of FIG. 4.

FIG. 6 is an elevational plan view of the stair stringer blank of the embodiment of FIG. 4 prior to being bent into a stair stringer.

DESCRIPTION OF THE PREFERRED EMBODIMENT

Figure 1:
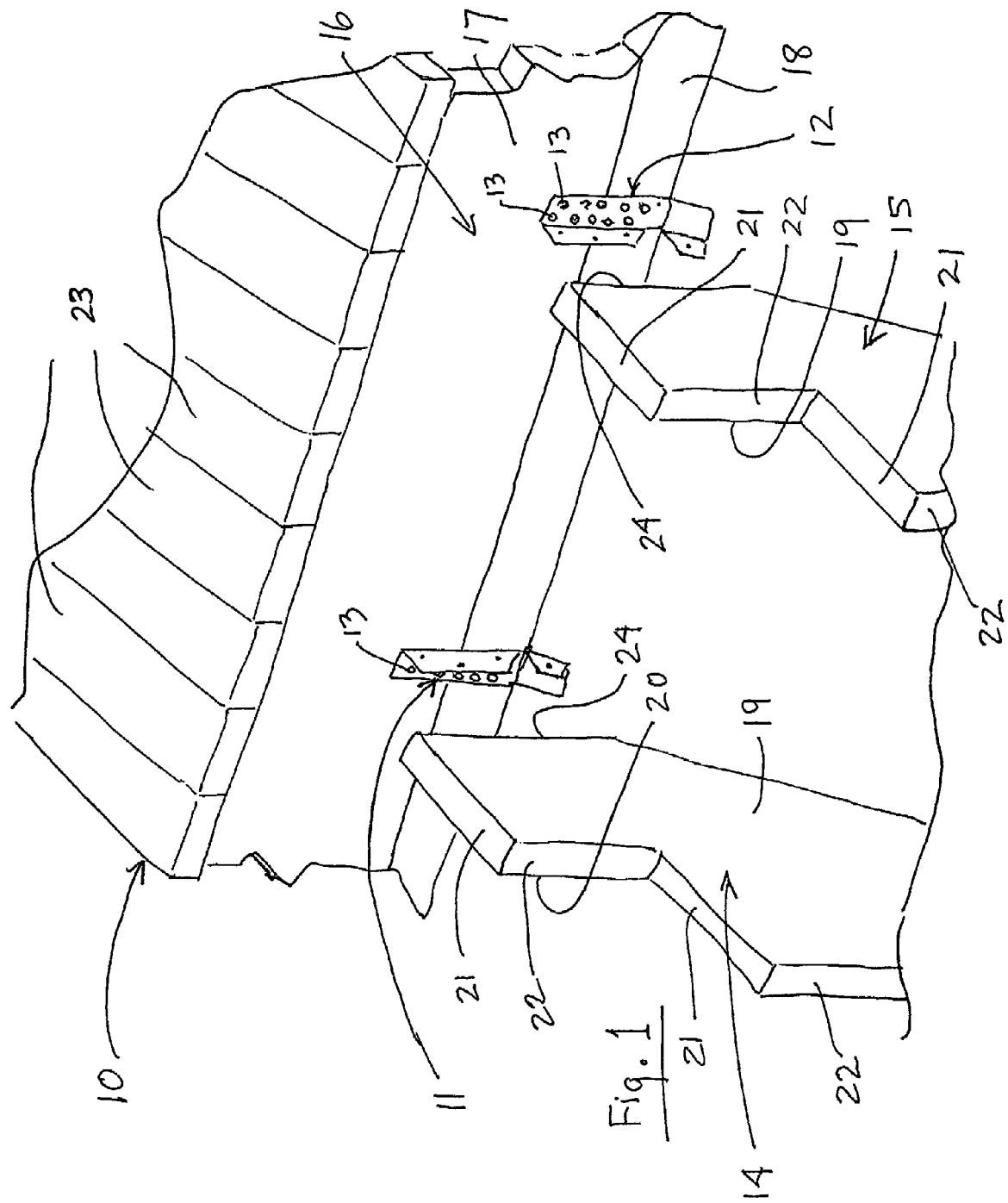
FIG. 1 is an isometric view showing a portion of a deck or the like and a pair of installed hangers for connecting a pair of stair stringers to the rim joist.

Although the present invention has applicability to connecting all types of stair or step stringers to a rim joist or header, it has particular applicability to connecting stair stringers to the rim joist of a deck with a concealed connection. Accordingly, the preferred embodiment will be described with respect to outdoor wood deck construction.

Reference is first made to FIG. 1 showing a portion of a deck 10 and a pair of installed stair hangers 11 and 12 to connect a laterally spaced pair of stair stringers 14 and 15 to the deck 10. The deck 10 is of standard construction comprising a rim joist 16 and a series of deck boards 23. The rim joist 16 includes the header 17 and also commonly includes an additional extension member 18. The member 18 is connected to the lower edge of the header 17 to facilitate connection of the stair stringers 14 and 15 to the rim joist 16. The extension member 18 may extend the entire length of the joist 16 or may extend only in the area between the stringers 14 and 15. The extension member 18 is connected with the header 17 by means known in the art.

Each of the pair of stair stringers 14 and 15, when installed, includes an inner surface 19 facing the inner surface of the other stair stringer and an outer surface 20 facing away from the other stringer. Each of the stringers 14 and 15 also includes a plurality of treads 21 for supporting tread plates and for defining the horizontal depth of the stair treads and a plurality of risers 22 defining the vertical distance between each step and supporting riser plates (if desired). A rearward edge 24 at the top of each stringer 14 and 15, when installed, is adjacent to and connected with the front face of the rim joist or header 16. In accordance with the present invention, the stringers 14 and 15 are connected with the rim joist 16 by a pair of stair stringer hangers 11 and 12. The hangers 11 and 12 are connected to the joist 16 by a plurality of nails 13. As will be described in greater detail below, when the stringers 14 and 15 are connected to the rim joist 16 with the connectors 11 and 12, a concealed connection is provided on the front face of the rim joist 16.

While the preferred embodiment describes connecting a pair of stair stringers to the rim joist, stairs or steps which span greater distances may require more than two stringers. The hanger or hangers of the invention are accordingly also applicable for connecting any number of stair stringers to the rim joist or other supporting structure.

Reference is next made to FIG. 2 showing a pair of stair stringer hangers 11 and 12 in accordance with one embodiment of the invention. As shown, the hangers 11 and 12 in this embodiment are left and right stair stringer hangers, respectively, and are substantially mirror images of one another. More specifically, each of the hangers 11 and 12 includes a base 25 connectable to the rim joist 16 (FIG. 1), a base flange 26 connectable to the inside surface of one of the inner surfaces 19 of the stair stringers 14, 15 (FIG. 1), a seat 28 integrally connected with and comprised of an extension of the base 25 and a seat flange 29 connectable to the inner surface 19 of one of the stair stringers 14, 15 (FIG. 1).

As shown, each of the base members 25 is generally rectangular in configuration and includes a top edge 30, a bottom edge integral with the seat 28 along the bend line 31, a free side edge 32 and a connecting side edge connected with the base flange 26 along the bend line 34. A plurality of round nail receiving openings 35 are provided in the base 25 to connect the base 25 and thus the entire hanger 11, 12 to the rim joist 16. In the preferred embodiment, the base 25 is provided with eight round openings 35 for this purpose. The base also includes a pair of diamond-shaped positioning or optional nailing openings 36. These openings 36 are designed to assist in positioning the hanger relative to the rim joist 16 to provide a specific riser height between the top of the tread plate and the deck surface and/or as optional nailing openings to accommodate desired header and/or riser dimensions. The diamond holes are located such that the top and bottom diamond holes will align where the seam between the header 17 and the piece 18 of the rim joist 16 adjoin. Specifically, the top and bottom diamond holes 36 will align or occur very close to seams created by 2"×10" and 2"×12" headers 17, respectively, which could make nails placed in these holes inconsequential.

In the embodiment of FIG. 2, the width of the base 25 (between the side edges) is about one and one-half inches, while the length (between the top and bottom edges) is about six inches. Although the base 25, and thus all elements of the hangers 11 and 12, may be constructed of a variety of materials, the material of the preferred embodiment is 18 gauge steel with a G-185 galvanizing finish which may also be coated, if desired. Connection of the base 25, and thus the hangers 11 and 12, to the rim joist 16 is provided using eight, 10 d (0.148 inch diameter), one and one-half inch nails.

The base flange 26 of each hanger 11, 12 includes a top edge 38 substantially continuous with the top edge 30 of the base 25, a downwardly and inwardly sloping bottom edge 39, a free side edge 40 and a connecting side edge connected with the base 25 along the bend line 34. Preferably, the flange 26 is bent relative to the base 25 at an angle of 90°. The base flange 26 is provided with three nail-receiving openings 41 to receive nails to connect the base flange 26 to the inside surface 19 of one of the stair stringers 14 and 15 (FIG. 1). Preferably, these receive three 10 d (0.148 inch diameter), one and one-half inch nails. The width of the flange 26 (between the side edges) is about one and one-half inches, while its length (between the top and bottom edges) is less than six inches.

The seat 28 includes a top edge integral with the bottom edge of the base 25 along the bend line 31, a bottom edge 44, a free side edge 42 and a connecting side edge connected with the seat flange 29 along the bend line 33. The seat 28 is a generally rectangular member being free of connection openings and having a width (between its side edges) of about one and one-half inches and a length (between its top and bottom edges) of about two inches. The seat 28 is positioned relative to the base 25 at an obtuse angle along the bend line 31. It is intended that the specific angle will be adjusted by the installer to match the angle between the rim joist 16 and the slope of the stringers 14 and 15 (FIG. 1).

The seat flange 29 includes an upwardly and inwardly sloping top edge 45, a bottom edge 46, a free side edge 48 and a connecting side edge connected with the seat 28 along the bend line 33. As shown, when constructed and when installed, the seat flange 29 is bent relative to the seat 28 along the bend line 33 at an angle of about 90°. The seat flange 29 is provided with a nail-receiving opening 49 for connection, with a 10 d (0.148 inch diameter), one and one-half inch nail to the inner surface 19 of one of the stringers 14 and 15 (FIG. 1).

FIG. 3 is an elevational plan view of one of the hangers 11,12 stamped from 18 gauge steel stock material and with the holes punched. FIG. 3 also shows the specific dimensions in accordance with the preferred embodiment of the hangers 11,12 and the relative positions of nail-receiving openings.

Reference is next made to FIGS. 4 and 5 showing a further embodiment of a stair or step hanger in accordance with the present invention. FIG. 4 shows the hanger prior to the seat being defined and bent, while FIG. 5 shows two of the hangers in position for installation and being prebent as either a right-hand hanger 53 or a left-hand hanger 57. Whereas the stair hanger embodiment of FIG. 2 comprised a pair of mirror image hangers, the embodiment of FIGS. 4 and 5 comprises a single, reversible hanger which can be used to connect both a left and a right stair stringer to a rim joist or other support structure. As shown, the reversible hanger of FIGS. 4 and 5 includes a base 50, a first base flange 55 connected with the base 50 near its mid point along the bend line 59 and a pair of base/seat flanges 56 and 58 connected with the base 50 along the bend lines 60 and 61, respectively.

More specifically, the base 50 is comprised of a central section 51 and a pair of end sections 52 and 54. The end sections 52 and 54 are integrally connected with the central section 51, but are partially separated from the central section 51 by the elongated openings 62. As will be described in greater detail below, the end sections 52 and 54 are designed to function either as a portion of the base, together with the section 51, to be connected with the rim joist 16 (FIG. 1) or as a seat to be bent and engage a bottom edge of one of the stair stringers 14,15 (FIG. 1). When the hanger of FIG. 4 is used to connect a left stair stringer such as the stringer 14 of FIG. 1, the section 52 will function as the seat, as shown by the hanger 57 in FIG. 5, while the section 54 will function as part of the base. When the hanger of FIG. 4 is used to connect a right stair stringer such as the stringer 15 of FIG. 1, the section 54 will function as the seat, as shown by the hanger 53 in FIG. 5, while the section 52 will function as part of the base.

The base 50 is a generally rectangular member having an end edge 64 defining one end of the end section 52, an end edge 65 defining an end of the end section 54, a free or unconnected edge 66 extending between the ends of the edges 64 and 65 and a connection edge opposite to and parallel with the free edge 66 and defining the bend lines 59, 60 and 61.

The center section 51 of the base includes a plurality of round nail receiving openings 68 and a pair of diamond-shaped optional nail receiving openings 69. When installed, the central section 51 is connected to the rim joist 16 (FIG. 1) by a plurality of 10 d (0.148 inch diameter) nails through the openings 68 (and optionally through the holes 69).

Each of the end sections 52,54 includes a plurality of round nail receiving openings 70 and a diamond-shaped optional nail receiving opening 71. When the end section 52 or 54 functions as a seat, none of the holes 70 or 71 is utilized. However, when one of the sections 52 or 54 functions as a part of the base, one or more of the openings 70 (or 71) is utilized to connect the base 50 to the rim joist. Preferably, to provide sufficient structural support rating, eight 10 d (0.148 inch diameter) nails are used to connect the base (comprised of the center section 51 and one of the end sections 52 or 54) to the rim joist. Each of the end sections 52 and 54 is separated from the central section 51 by an elongated, laterally extending opening 62. This opening 62 functions primarily to facilitate bending of the end sections 52 and 54 relative to the center section 51 when such end section 52,54 functions as a seat. Other means could, however, be utilized to facilitate or assist such bending.

The base flange 55 is joined to the central section 51 of the base 50 at right angles along the bend line 59 and includes a pair of end edges 72 and a side edge 74. As shown best in FIG. 6, the side edge 74 is generally parallel to the bend line 59 while the end edges 72 form an angle of about 20 degrees relative to a line extending perpendicular to the bend line 59. The base flange 55 includes a pair of round nail receiving openings 75 and a single diamond-shaped opening 76. The opening 76 can be used as an optional nail receiving opening or as a temporary screw hole to support the stair stringer relative to the hanger while the nails are driven into the inner side of the hanger through the openings 75. When installed, the base flange 55 is connected to the inside surface 19 (FIG. 1) of one of the stair stringers with two 10 d (0.148 inch diameter) nails.

Each of the flanges 56 and 58 is connected respectively to the end sections 52 and 54 along the bend lines 60 and 61 and includes an outer end edge 78, an inner edge 79 and a side edge 80. As shown best in FIG. 6, the side edge 80 is generally parallel to its respective bend line 60,61. The outer end edges 78 extend at right angles relative to their respective bend lines 60,61 and the inner end edges 79 extend at an angle of about 30 degrees relative to a line perpendicular to the respective bend lines 60,61. With this structure, as shown best in FIG. 6, the inner end edges 79 form an included angle with a corresponding end edge 72 of the base flange 55 of about 50 degrees. This opening between the edges 79 and 72 provides sufficient clearance to accommodate bending of one of the end sections 52 or 54 relative to the center section 52 when such end section is functioning as a seat. Each of the flanges 56 and 58 includes a single round opening 81 for connection via a 10 d (0.148 inch diameter) nail to the inner surface 19 (FIG. 1) of one of the stair stringers. When the section 52 functions as the seat and the section 54 functions as part of the base, the flange 56 functions as a seat flange and the flange 58 functions as a base flange as shown in FIG. 5. When the section 54 functions as the seat, the flange 58 functions as the seat flange while the flange 56 functions as a base flange.

FIG. 5 shows the reversible hanger of FIG. 4 being bent as either a right-hand hanger 53 or as a left-hand hanger 57.

FIG. 6 is an elevational plan view of the hanger of the embodiment of FIGS. 4 and 5 stamped from 18 gauge steel stock material and with the holes punched. FIG. 6 also shows the specific dimensions in accordance with the preferred embodiment of the hanger of FIGS. 4 and 5 and the relative positions of nail receiving openings.

Accordingly, the present invention is directed to a pair of hangers which are each connectable to a rim joist and which are also connectable, respectively, to a pair of stair or step stringers. Such pair can be the first and second mirror image hangers 11 and 12 of the embodiment of FIG. 2 or two of the reversible hangers of FIGS. 4 and 5. Each of the hangers includes a base or base section connectable to the rim joist and a seat connectable with a bottom edge of the base along a bend line. Flanges in the form of a base flange or flanges and a seat flange are connected to one side edge of the base and seat, respectively, with the base and seat flanges provided with nail-receiving openings to connect the flange to the inner surface of a stair stringer. The opposite or outside edge of each base and seat includes a free edge to provide a concealed connection system.

Having described the structure of the embodiments of the present invention, its application and use can be understood as follows. For the embodiment of FIG. 2, a pair of substantially mirror image hangers are connected with the rim joist 16 with nails 13 (FIG. 1) through the openings 35 in the base 25 and into the rim joist 16. Each of the hangers 11 and 12 is positioned heightwise relative to the rim joist 16 to accommodate a desired rise and widthwise to accommodate the desired distance between a pair of stair stringers 14 and 15. As shown best in FIG. 1, the hangers 11 and 12 are connected with the front face of the rim joist 16 so that the base and seat flanges face inwardly toward one another. The stair stringers 14 and 15 are then positioned relative to the rim joist 16 and the installed hangers 11 and 12 so that the rearward upper edges 24 of the stringers 14 and 15 are adjacent to the base of the hangers and the base and seat flanges of the hangers are adjacent to the inside surface 19 of the hangers 14 and 15. The seats 28 of the hangers 11 and 12 are then bent upwardly against the bottom edge of the stringers 14 and 15 and nails are inserted through the openings in the base and seat flanges into the stringers 14 and 15 from the inner surface. The stairs can then be finished with tread plates and riser plates (if desired).

For the embodiment of FIGS. 4 and 5, a pair of the hangers of FIG. 4 are used and eventually bent either along the line joining the base sections 51 and 52 or the base sections 51 and 54 to form a pair of substantially mirror image hangers such as the hangers 53 and 57 shown in FIG. 5. This pair of hangers is then used to connect a pair of stair or step stringers to a rim joist in the same manner as the hangers 11 and 12 of FIG. 2. Specifically, each of the hangers of FIG. 4 is positioned height-wise relative to the rim joist 16 to accommodate a desired rise and width-wise to accommodate the desired distance between a pair of stair stringers. The hangers are then connected with the front face of the rim joist 16 so that the base and seat flanges face inwardly toward one another as shown in FIG. 5. Nails are then driven through the openings in the base center section 51 and one of the base end sections 52 or 54 into the rim joist 16. The stair stringers 14 and 15 are then positioned relative to the rim joist 16 and the installed hangers so that the rearward upper edges of the stringers are adjacent to the base of the hangers and the base and seat flanges of the hangers are adjacent to the inside surface of the hangers. The seats (52 or 54) of the hangers are then bent upwardly against the bottom edge of the stringers and nails are inserted through the openings in the base and seat flanges into the stringers 14 and 15 from the inner surface. To assist in positioning the stringer relative to a hanger, a screw can be driven temporarily through the diamond-shaped opening 76 into the inner side 19 of the stringer.

Use of the hangers 11 and 12 of the FIG. 2 embodiment and the hanger of the FIG. 4 embodiment have been described with respect to a pair of stair stringers 14 and 15 (FIG. 1). If the steps are wide enough so that one or more additional intermediate stringers are required between the end stringers, additional hangers (either those of the FIG. 2 embodiment or those of the FIG. 4 embodiment) can be used. When installing intermediate stringers, concealment of hangers is usually not an issue. Thus, either a left-hand or a right-hand hanger can be utilized.

Although the description of the preferred embodiment has been quite specific, it is contemplated that various modifications could be made without deviating from the spirit of the present invention. Accordingly, it is intended that the scope of the present invention be dictated by the appended claims rather than by the description of the preferred embodiment.

The invention claimed is:

1. A stair structure comprising:
   a stair stringer comprising:
      a sloping bottom surface;
      a stepped top surface including a plurality of alternating and consecutive treads with a length and risers with a height, the treads horizontally oriented and the risers vertically oriented orthogonal to the treads, the tread length and riser height together defining a stringer slope; and
      a first end near a bottom landing and a second end near a top landing, the second end comprising a last tread intersecting with a substantially vertical abutment face, the abutment face intersecting with the sloping bottom surface, the intersection of the abutment face and the sloping bottom surface defining a work point;
   a structural member forming an edge of the top landing, the structural member having a top edge and a bottom edge defining a depth there between and further having a front face; and
   a connector connecting the stair stringer to the structural member, the connector being structurally rated for conditions where, at a connection point between the stringer and the structural member, the bottom surface of the stringer is below the bottom edge of the structural member, the connector including:
      a base with a first end and a base flange connecting side edge, the base having a plurality of connecting member receiving openings, the connecting member receiving openings including at least one positioning opening for positioning the connector vertically relative to the structural member;
      a seat having a seat flange connecting side edge, the seat bendably connected to the base along the first end;
      a base flange orthogonally connected to the base along the base flange connecting side edge; and
      a seat flange orthogonally connected to the seat along the seat flange connecting side edge; wherein:
   the stair stringer is positioned such that the last tread is positioned relative to the top edge of the structural member a vertical distance equal to the riser height and the abutment face is positioned adjacent to the front face of the structural member; and
   the first end of the base is positioned at the work point and the at least one positioning opening is located in alignment with the bottom edge of the structural member.

2. A stair structure comprising:
   a stair stringer having a width and comprising:
      one of an edge stringer or an intermediate stringer, wherein an inward face of an edge stringer or either face of an intermediate stringer defining a concealed face;
      a sloping bottom surface;
      a stepped top surface including a plurality of alternating and consecutive treads with a length and risers with a height, the treads horizontally oriented and the risers vertically oriented orthogonal to the treads, the tread length and riser height together defining a stringer slope; and
      a first end near a bottom landing and a second end near a top landing, the second end comprising a last tread intersecting with a substantially vertical abutment face, the abutment face intersecting with the sloping bottom surface, the intersection of the abutment face and the sloping bottom surface defining a work point;
   a structural member forming an edge of the top landing, the structural member having a top edge and a bottom edge defining a depth there between and further having a front face, the structural member being one of a nominal 10" or a nominal 12" deep piece of dimensioned or engineered lumber; and
   a connector connecting the stair stringer to the structural member, the connector being structurally rated for conditions where, at a connection point between the stringer and the structural member, the bottom surface of the stringer is below the bottom edge of the structural member, the connector including:
      a generally rectangular base with a first end, a free side edge, and a base flange connecting side edge opposite the free side edge, the base having a width substantially equal to the width of the stringer, the base having a plurality of connecting member receiving openings, the connecting member receiving openings including a first and a second positioning opening for positioning the connector vertically relative to the structural member;
      a generally rectangular seat having a free side edge and a seat flange connecting side edge opposite the free side edge, the seat having a width equal to the width of the stringer, the seat connected to the base along the first end;
      a generally trapezoidal base flange orthogonally connected to the base along the base flange connecting side edge and having a plurality of connecting member receiving openings; and
      a generally trapezoidal seat flange orthogonally connected to the seat along the seat flange connecting side edge and having a connecting member receiving opening; wherein:
   the stair stringer is positioned such that the last tread is positioned relative to the top edge of the structural member a vertical distance equal to the riser height and the abutment face is positioned adjacent to the front face of the structural member;
   the first end of the base is positioned at the work point such that the base is positioned and concealed between the abutment face of the stringer and the front face of the structural member, the seat is positioned along the sloping bottom surface of the stringer, and the base flange and seat flange are both positioned adjacent the concealed face of the stringer; and
   the first positioning opening is located in alignment with the bottom edge of the structural member when the structural member is a nominal 10" deep piece of dimensioned or engineered lumber and the second positioning opening is located in alignment with the bottom edge of the structural member when the structural member is a nominal 12" deep piece of dimensioned or engineered lumber.

3. A reversible stair hanger for connecting a stair stringer to a rim joist, comprising:
   a base connectable to the rim joist, the base defining a flat, rectangular shaped surface, the base having a first seat end and a second seat end, the first and second seat ends defining first and second bend lines, the base further having a free side and a flange side, the flange side defining a third bend line orthogonal to the first and second bend lines, the base further having a plurality of connecting member receiving openings, the openings arranged in a first row and a second row, the first and second rows extending parallel to the free side and the flange side, each row having equally spaced openings, the openings of the first row staggered from the openings in the second row by half the spacing of the openings in the first row;

a first seat adapted to receive the stair stringer or connect to the rim joist, the first seat defining a flat, rectangular shaped surface, the first seat having a free end and a base end, the base end connected to the base along the first seat end of the base, the seat further having a free side and a flange side, the flange side being collinear with the flange side of the base in at least a pre-bent condition, the flange side further defining the third bend line, the first seat further having a plurality of connecting member receiving openings, the openings arranged in a first row and a second row, the first and second rows aligning with the first and second rows of plurality of connecting member receiving openings in the base, each row having equally spaced openings, the openings of the first row staggered from the openings in the second row by half the spacing of the openings in the first row;

a second seat adapted to receive the stair stringer or connect to the rim joist, the second seat defining a flat, rectangular shaped surface, the second seat having a free end and a base end, the base end connected to the base along the second seat end of the base, the seat further having a free side and a flange side, the flange side being collinear with the flange side of the base in at least a pre-bent condition, the flange side further defining the third bend line, the second seat further having a plurality of connecting member receiving openings, the openings arranged in a first row and a second row, the first and second rows aligning with the first and second rows of plurality of connecting member receiving openings in the base, each row having equally spaced openings, the openings of the first row staggered from the openings in the second row by half the spacing of the openings in the first row;

a base flange connectable to the stair stringer, the base flange defining a flat, trapezoidal shaped surface, the base flange having a first free end, a second free end, a free side and a base side, the first free end defining an obtuse angle relative to the free side and an acute angle relative to the base side, the second free end defining an obtuse angle relative to the free side and an acute angle relative to the flange side, the base side being approximately the same length as the flange side of the base and connected to the flange side of the base, the base flange further having a plurality of connecting member receiving openings;

a first seat flange connectable to the stair stringer, the first seat flange defining a flat, trapezoidal shaped surface, the first seat flange having a first free end, a second free end, a free side, and a seat side, the first free end being orthogonal to the free side and the seat side, the second free end defining an obtuse angle relative to the free side and an acute angle relative to the seat side, the first free end being collinear with the free end of the first seat in a pre-bent condition, the seat side being approximately the same length as the flange side of the first seat and connected to the flange side of the first seat, the first seat flange having a connecting member receiving opening;

a second seat flange connectable to the stair stringer, the second seat flange defining a flat, trapezoidal shaped surface, the second seat flange having a first free end, a second free end, a free side and a seat side, the first free end being orthogonal to the free side and the seat side, the second free end defining an obtuse angle relative to the free side and an acute angle relative to the seat side, the first free end being collinear with the free end of the second seat in a pre-bent condition, the seat side being approximately the same length as the flange side of the second seat and connected to the flange side of the second seat, the second seat flange having a connecting member receiving opening; wherein:

the base flange is bent relative to the base along the third bend line such that their respective surfaces are orthogonal to one another;

the first seat flange is bent relative to the first seat along the third bend line such that their respective surfaces are orthogonal to one another;

the second seat flange is bent relative to the second seat along the third bend line such that their respective surfaces are orthogonal to one another; and the first seat and second seat together with their respective first and second seat flanges may be positioned to accommodate varying sloped stair stringers by bending the first or second seat relative to the base along the first or second bend line respectively.

4. The stair hanger of claim 3 wherein, the hanger is symmetrical about a line bisecting the hanger, the line defined by a midpoint of the free side of the base and a midpoint of the flange side of the base.

5. The stair hanger of claim 4 further comprising a first elongated opening positioned on the first bend line and a second elongated opening positioned on the second bend line.

6. The stair hanger of claim 5, wherein:
at least one of the plurality of connecting member receiving openings in the first seat is a positioning opening spaced from the second bend line to align with the bottom of a 10" nominal depth rim joist, for conditions where the first seat functions as a portion of the base; and
at least one of the plurality of connecting member receiving openings in the second seat is a positioning opening spaced from the first bend line to align with the bottom of a 10" nominal depth rim joist, for conditions where the second seat functions as a portion of the base.

7. The stair hanger of claim 6, wherein:
at least one of the plurality of connecting member receiving openings in the base is a positioning opening spaced from the second bend line to align with the bottom of a 12" nominal depth rim joist, for conditions where the first seat functions as a portion of the base; and
at least one of the plurality of connecting member receiving openings in the base is a positioning opening spaced from the first bend line to align with the bottom of a 12" nominal depth rim joist, for conditions where the second seat functions as a portion of the base.

8. The stair hanger of claim 7, wherein the positioning openings are diamond shaped openings.

* * * * *